United States Patent
Yamada

(10) Patent No.: US 6,438,801 B1
(45) Date of Patent: Aug. 27, 2002

(54) HOLDERLESS CLAMPING HOSE

(75) Inventor: Satoshi Yamada, Yokohama (JP)

(73) Assignee: Piolax, Inc., Kanagawa-Ken (JP)

( * ) Notice: Subject to any disclaimer, the term of this patent is extended or adjusted under 35 U.S.C. 154(b) by 0 days.

(21) Appl. No.: 09/669,071

(22) Filed: Sep. 22, 2000

(30) Foreign Application Priority Data

Sep. 24, 1999 (JP) .......................................... 11-269837

(51) Int. Cl.[7] .............................................. F16L 33/00
(52) U.S. Cl. ...................................... 24/20 R; 24/20 S
(58) Field of Search ........................ 24/23 R, 22, 23 W, 24/20 CW, 20 R, 20 S

(56) References Cited

U.S. PATENT DOCUMENTS

| | | | | |
|---|---|---|---|---|
| 4,713,863 A | * | 12/1987 | Jennings ..................... | 24/20 R |
| 4,773,129 A | * | 9/1988 | Muhr ........................ | 24/20 R |
| 4,930,192 A | * | 6/1990 | Muhr ........................ | 24/20 R |
| 4,996,749 A | * | 3/1991 | Takahashi ................... | 24/20 R |
| 5,185,907 A | * | 2/1993 | Kawashima et al. ......... | 24/20 R |
| 5,414,905 A | * | 5/1995 | Kimura et al. .............. | 24/20 R |
| 5,596,790 A | * | 1/1997 | Moller ....................... | 24/20 R |
| 5,819,376 A | * | 10/1998 | Kovalsky et al. ........... | 24/23 R |
| 5,820,166 A | * | 10/1998 | Webb ........................ | 24/20 R |
| 5,855,044 A | * | 1/1999 | Cradduck ................... | 24/20 R |
| 6,095,251 A | * | 8/2000 | Zielinski .................... | 24/20 R |
| 6,192,555 B1 | * | 2/2001 | Nakamura et al. .......... | 24/20 R |

FOREIGN PATENT DOCUMENTS

JP    1061855    3/1989

* cited by examiner

Primary Examiner—Lynne H. Browne
Assistant Examiner—David E. Bochna
(74) Attorney, Agent, or Firm—Howard & Howard

(57) ABSTRACT

A hose clamp comprises a clamp ring made of a metal strip rolled into a loop with its ends overlapping each other. First and second pinches are projected up from the ends of the metal strip in the radial direction. The first pinch has a frame, which defines an opening inside the frame, and a stopper wall swelling into the inside opening from a corner of the frame. The second pinch has an operation chip extending in the width direction of the cram ring. A stopper rises from the clamp ring near the root of the second pinch. The hose clamp has a clamping position, at which the first and second pinches are apart from each other, and a loosened position, at which the first and second pinches are very close to each other. At the loosened position, the operation chip of the second pinch sticks out from the clamp ring in the width direction of the clamp ring.

7 Claims, 5 Drawing Sheets

HOLDERLESS CLAMPING HOSE

The present patent application claims the benefit of earlier Japanese Patent Application No. H11-269837 filed on Sep. 24, 1999, the disclosure of which is incorporated herein by reference.

BACKGROUND OF THE INVENTION

1. Field of the Invention

This invention relates to an improved arrangement of a hose clamp for attaching a rubber hose to the end of a connection pipe, which does not require a separate holder to keep the hose clamp at a loosened position.

2. Description of the Related Art

A hose clamp is used to attach a rubber hose to a pipe. In general, hose clamp has a clamping position for tightening the hose against the outer wall of the pipe, and a loosened position for allowing the end of the pipe to be inserted into the hose. A holderless-type hose clamp, which does not require a separate holder for retaining the clamp at a loosened position, has been proposed in, for example, Japanese Patent Application Laid-open No. 10-61855.

FIGS. 1a and 1b illustrates an example of such a prior art holderless-type hose clamp. The hose clamp 1 is comprised of a clamp ring 2 made of a strip of spring leaf rolled into a loop with the ends overlapping each other. First and second pinches 6 and 9 extend from the ends of the clamp ring 2, and are projected up in the radial direction of the clamp ring 2. The first pinch 6 includes a frame having the same width as the clamp ring 2, combined with an opening. The opening is connected with a guide groove formed in the clamp ring 2. The frame has a projection 7 extending in the radial direction. A stopper 11 extends from the frame toward the inside opening with its end 12 bent zigzagly down. The width of the second pinch 9 is narrower than that of the first pinch 6, and is movable in the guide groove. The second pinch 9 has a tooth 14 and a shifting edge 9a that can be displaced by the axial movement of the second pinch 9 under an external force.

In the natural state, the clamp ring 2 is at a clamping position by its own restoring force. To loosen the clamp ring 2 in order to receive a pipe, a pair of pliers is used to bring the pinches 6 and 9 closer to each other along the circumference of the clamp ring 2. The tooth 14 of the second pinch 9 gets behind the stopper 11 of the first pinch 9, and then, it is meshed with the stopper 11. In this state, the clamp ring 2 is held at a loosened position, and a pipe is inserted in the hose.

To release the engagement between the tooth 14 and the stopper 11, the shifting edge 9a of the second pinch 9 is displaced by pliers in the radial direction, thereby being moved away from the stopper 11. The displacement of the shifting piece 9a causes the tooth 14 to be disengaged from the stopper 11. Consequently, the clamp ring 2 restores to the clamping position having its own restoring force, and tightens the hose against the pipe.

This type of conventional hose clamp does not require a separate holder to retain the pinches at a closer position to keep the clamp ring 2 loose.

However, the conventional hose clamp illustrated in FIGS. 1a and 1b has problems in size and reliable disengagement of the tooth 14 from the stopper 11. In releasing the engagement, the edge of the projection 11 of the first pinch 6 and the shifting edge 9a of the second pinch 9 are held by a pair of pliers, and moved in the axial direction of the clamp ring 2. For this reason, the projection 7 of the first pinch 6 and the shifting edge 9a of the second pinch 9 must have a sufficient size to allow the pliers to grasp the edge of projection 7 and the shifting edge 9a. This means that the pinches 6 and 9 can not be made smaller in the radial direction.

If the pinches 6 and 9 are made too small, then they can not be held by the pliers because the projection 7 and the shifting edge 9a, both extending in the radial direction of the clamp ring 2, become insufficient.

The stopper 11, which extends into the opening, also disturb the pliers from reliably grasping the shifting edge 9a. In addition, since the shifting edge 9a is entirely positioned within the width of the frame of the first pinch 6, the pliers are very likely to slip from the shifting edge 9a.

SUMMARY OF THE INVENTION

The present invention was conceived to overcome these problems in the conventional hose clamp, and it is an object of the invention to provide an improved holderless-type hose clamp.

To achieve the object, a hose clamp of the present invention includes a clamp ring made of a metal strip rolled into a loop with its ends overlapping each other. The clamp ring has a restoring force. First and second pinches are projected up from the ends of the metal strip in the radial direction. The first pinch has a frame that defines an opening inside it, and a stopper wall swelling into the inside opening from a corner of the frame. The second pinch gets through the opening of the first pinch, so that the first and second pinches cross each other. The second pinch has an operation chip extending in the width direction of the clamp ring. A stopper rises from the clamp ring near the root of the second pinch.

The hose clamp has a clamping position, at which the first and second pinches are apart from each other, and a loosened position, at which the first and second pinches are very close to each other. At the loosened position, the operation chip of the second pinch sticks out from the clamp ring in the width direction of the clamp ring.

When the hose clamp is brought into the loosened position, the stopper gets out of the opening of the first pinch, and abuts against the rear face of the stopper wall at the loosened position, whereby the clamp ring can be kept at the loosened position.

Preferably, the stopper wall has a hook, which prevents the stopper from slipping off from the stopper wall at the loosened position. Preferably, the hook is made monolithically with the stopper wall.

These arrangements allow the hose clamp to be made compact, while allowing the users to easily and reliably loose and tighten the hose clamp. In addition, the hose clamp can be kept at the loosened position in a safe manner.

BRIEF DESCRIPTION OF THE DRAWINGS

Other objects, features, and advantages of the invention will be parent from the following detailed description in conjunction with the attached drawings, in which:

FIGS. 1a and 1b illustrates a conventional prior art hose clamp, in which FIG. 1A shows the hose clamp in the clamping position, and FIG. 1B shows how the clamp ring is released from the loosened position;

DETAILED DESCRIPTION OF THE PREFERRED EMBODIMENT

The invention will now be described in detail in conjunction with the attached drawings.

Figure 1A:
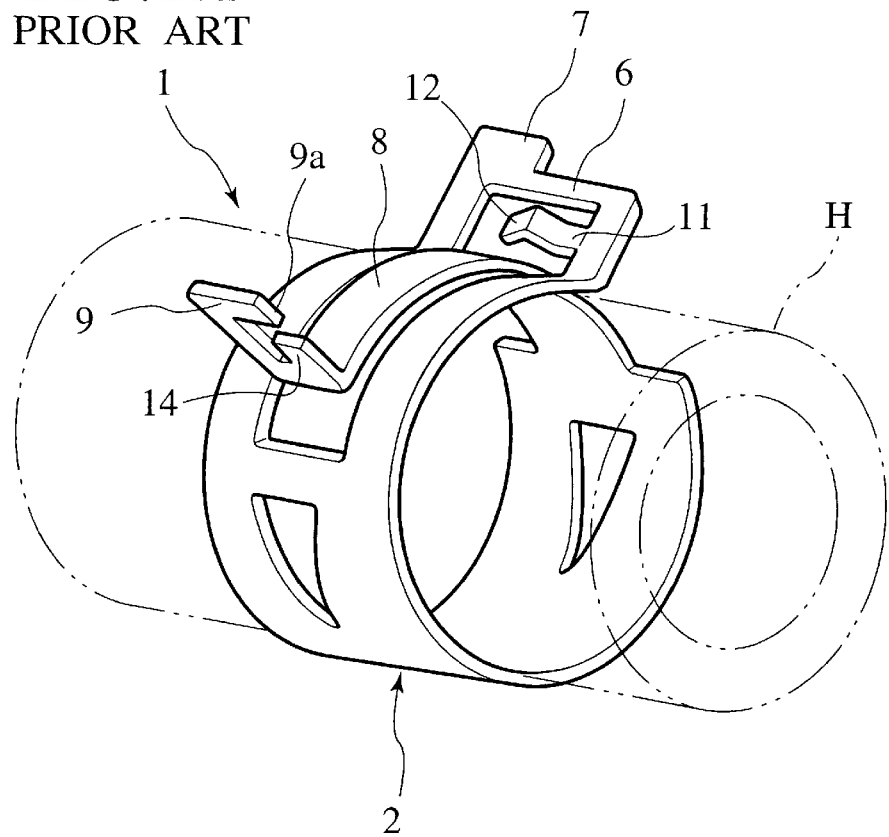
Figure 1B:
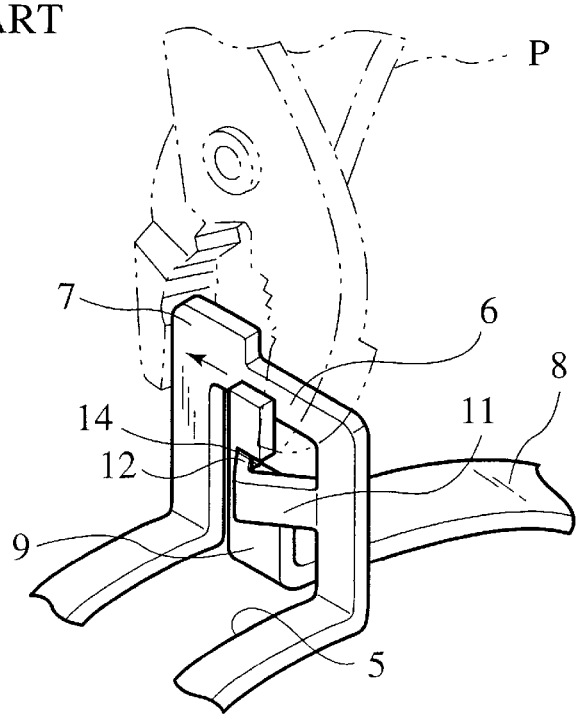
Figure 2A:
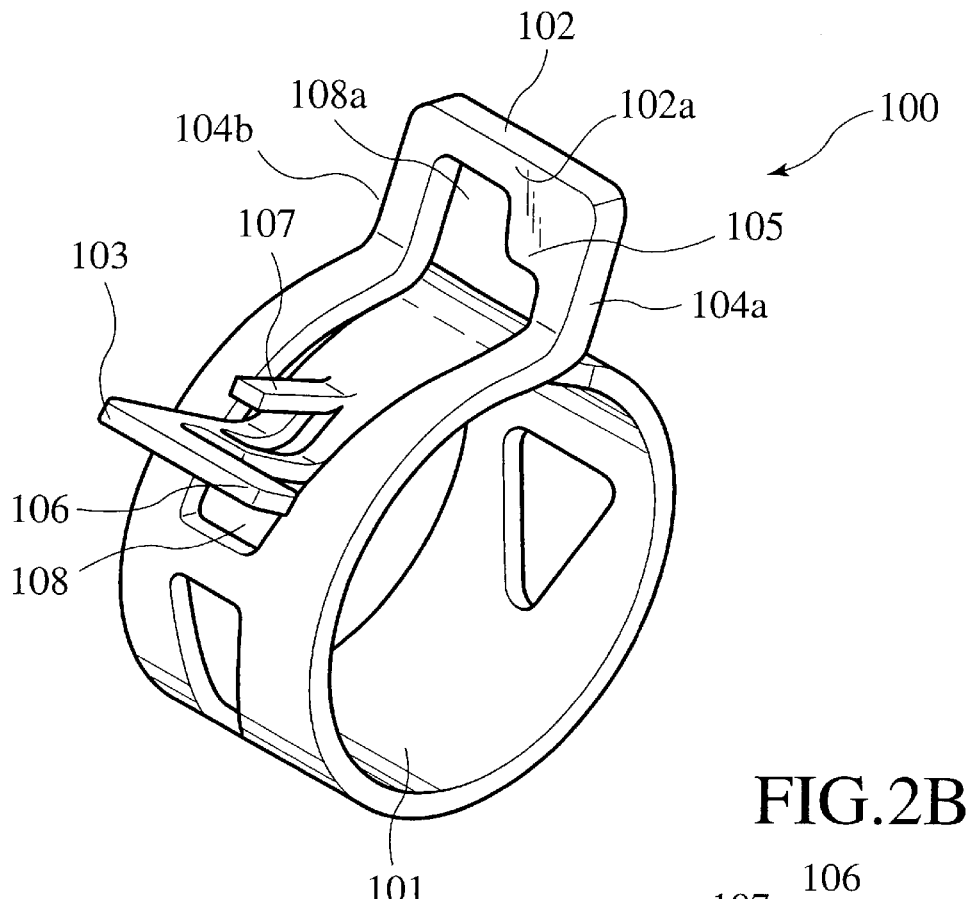
FIGS. 2a and 2b illustrates in two different views a hose clamp designed according to an embodiment of the invention.
Figure 2B:
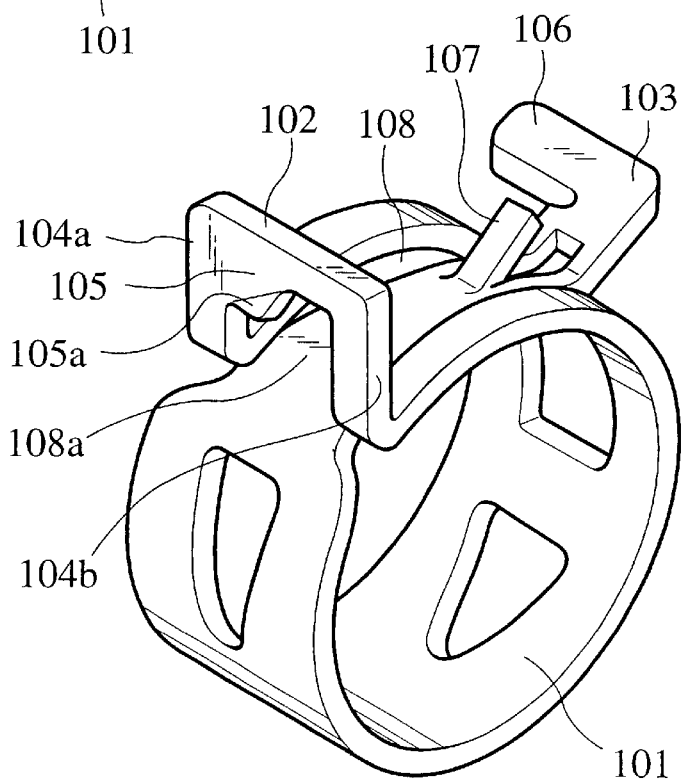

FIG. 2a and 2b illustrates a hose clamp 100 according to the preferred embodiment of the invention. The feature of the hose clamp 100 of the present invention resides in the shapes of the first (i.e., the wider) pinch 102 and the second (i.e., the narrower) pinch 103.

Figure 3:
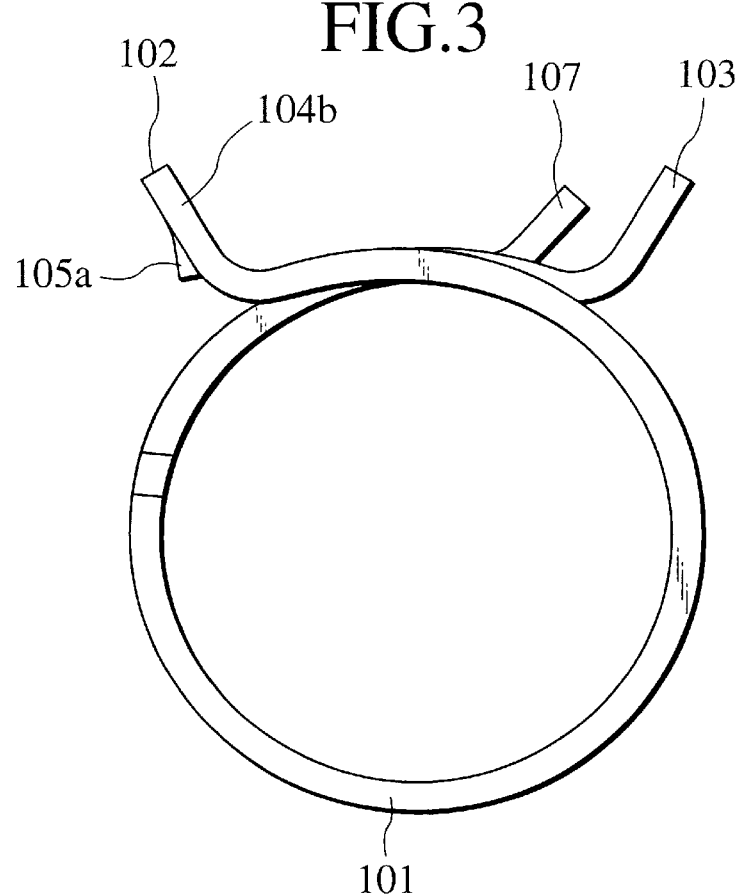
FIG. 3 is a side view of the hose clamp shown in FIG. 2b.

The hose clamp 100 comprises a clamp ring 101 made with a metal strip rolled into a loop, and a pair of pinches 102 and 103 projecting up in the radial direction from the ends of the clamp ring 101 and crossing each other, as shown in FIG. 3. The first pinch 102 includes a frame 102a having the same width as the clamp ring 101. The frame 102a defines an opening 108a inside it. A guide groove 108 extends along the clamp ring 101 near the first pinch 102, and is connected to the opening 108a. The first pinch 102 also has a stopper wall 105 swelling into the inside opening 108a from a corner of the frame 102a. The stopper wall 105 has a small hook 105 bending outward (i.e., away from the second pinch 103), as shown in FIGS. 2B and 3.

The second pinch 103 gets through the opening 108a of the first pinch 102, and is positioned in the guide groove 108, so that the first and second pinches 102 and 103 cross each other. The second pinch 103 includes an operation chip 106 extending in the axial direction of the clamp ring 101. The clamp ring 101 has a stopper 107 rising from the root of the second pinch 103.

Figure 4:
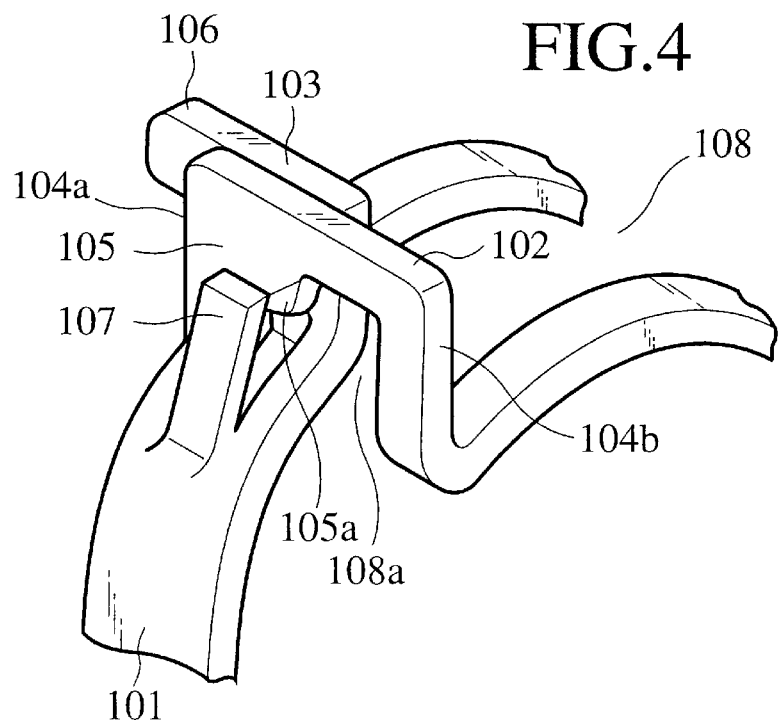
FIG. 4 illustrates in a perspective view how the hose clamp of FIG. 2a and 2b is retained at the loosened position.
Figure 5:
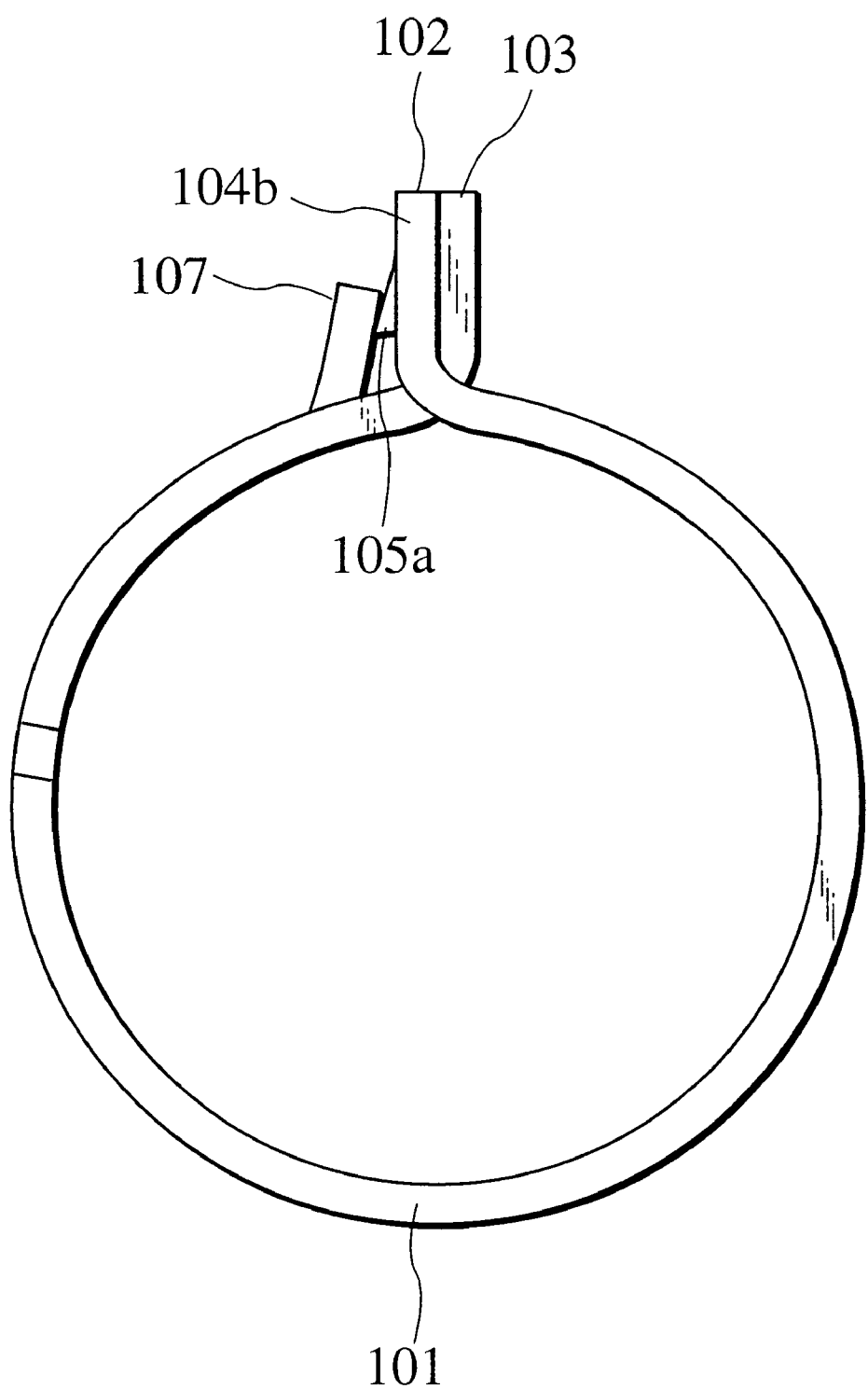
FIG. 5 illustrates in a side view how the hose clamp of FIG. 4.

In the normal state, the clamp ring 101 is at a clamping position under its own restoring force. To bring the clamp ring 101 to a loosened position, an external force is applied so as to bring the first and second pinches 102 and 103 close to each other, while slightly shifting the second pinch 103 in the width direction of the clamp ring 101. Namely, the second pinch 103 is slightly pushed away from the swelling stopper wall 105 of the first pinch 103. Under the external force, the second pinch 103 moves toward the first pinch 102 along the guide groove 108, and the stopper 107 rising from the root of the second pinch 103 gets out of the opening 108a. Then, if the external force is removed, the stopper 107 abuts against the rear face of the stopper wall 105 of the first pinch 102, as shown in FIGS. 4 and 5. In this state, the clamp ring 1 is prevented from restoring to the clamping position because of the contact between the stopper 107 and the stopper wall 105, and is kept at a loosened position. Then, a pipe is inserted in a hose, which is surrounded by the loosened hose clamp 101.

The hook 105a of the stopper wall 105 of the first pinch 102 prevents the stopper 107 from slipping off the stopper wall 105 when the clamp ring 101 is kept at the loosened position. In other words, the hook 105a allows the stopper 107 to keep the clamp ring 101 loose in a reliable manner.

To loosen the clamp ring 101, an external force is applied by, for example, a pair of pliers, which bring the first and second pinches 102 and 103 close to each other. At the loosened position, if the external force is removed, the operation chip 106 of the second pinch 103 sticks out from a side edge 104a of the first pinch 102 in the width direction of the clamp ring 101, as shown in FIG. 4.

Figure 6:
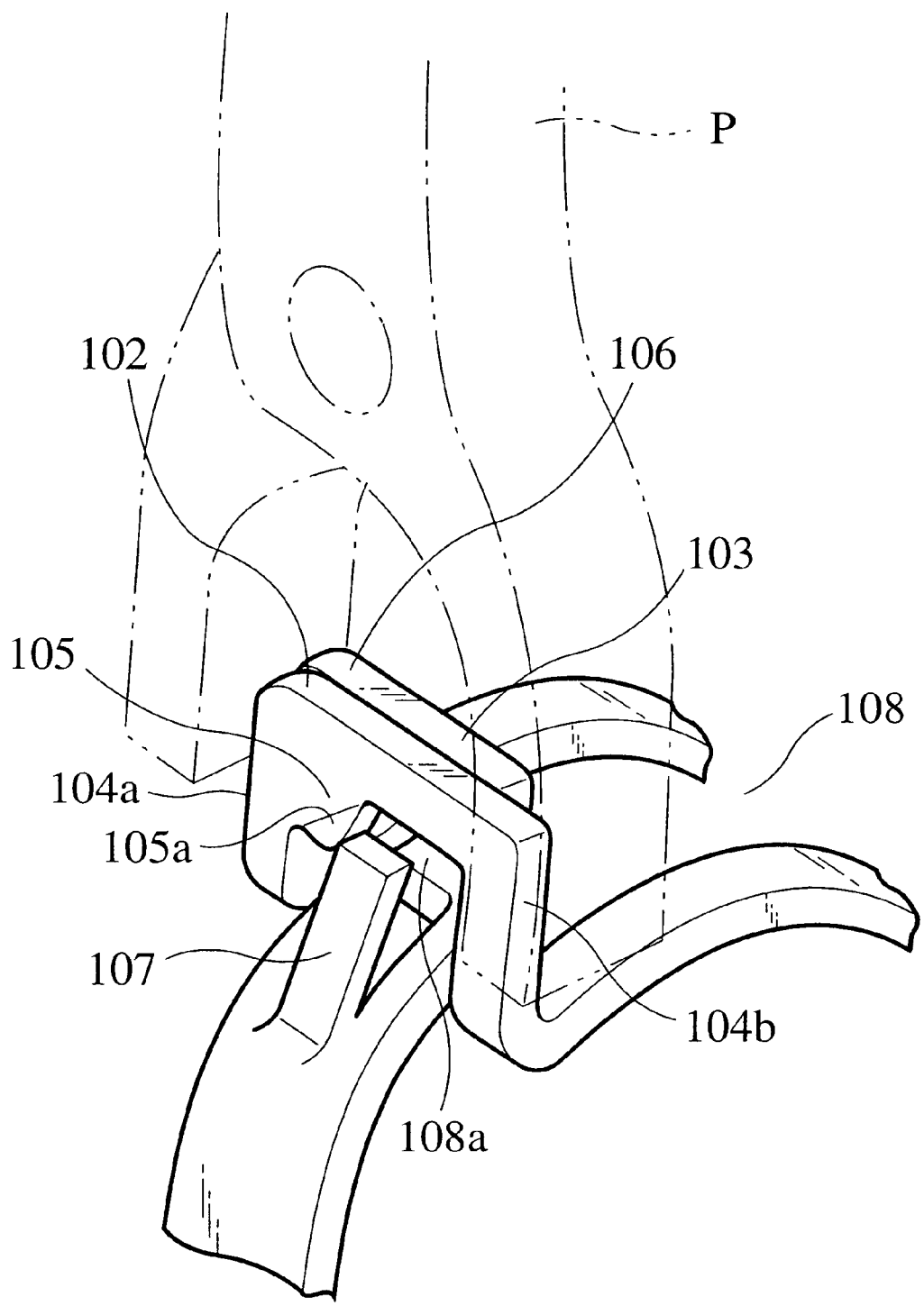
FIG. 6 illustrates how the hose clamp of FIG. 2 is released from the loosened position.

To release the engagement between the stopper 107 and the stopper wall 105, the operation chip 106 of the second pinch 103 and the side edge 104b of the first pinch 102 are grasped by pliers, P as shown in FIG. 6. Because the edge of the operation chip 106 and the side edge 104b of the first pinch 102 frame stick out from each other in the width direction of the clamp ring 101 without any obstacles, they are reliably grasped by the pliers.

Then, the first and second pinches 102 and 103 are slid relative to each other in the width direction of the clamp ring 101 in such a manner that the stopper 107 comes off the stopper wall 105. Once the stopper 107 is disengaged from the stopper wall 105, the clamp ring 101 returns to the clamping position by its own restoring force.

As the feature of the present invention, the operation chip 106 of the second pinch 103 extends in the lateral direction, that is, in the width direction of the clamp ring 101, unlike the conventional hose clamp that has a projection (or an operation chip) extending in the radial direction. While the operation chip 106 can be made large because it is not limited in size in the radial direction, the second pinch 103 itself can be made very small, whereby the hose clamp 100 can be made compact.

The sufficient size of the operation chip 106, which sticks out of the width of the clamp ring 101, allows the pliers to reliably grasp the first and second pinches, and to readily disengage the stopper 107 from the stopper wall 105.

The hook 105a of the stopper wall 105 allows the stopper wall 105 to stop the stopper 107 without fail, thereby keeping the clamp ring 101 at the loosened position in a reliable manner. The hook 105a may be formed monolithically with the stopper wall 105, which facilitates the manufacturing process of the clamp ring 101.

It should be noted that, besides those already mentioned above, many modifications and variations may be made without departing from the novel and advantageous features of the present invention. Although the hook, which is manufactured monolithically with the stopper wall, is used to prevent the stopper slipping off the stopper wall, any other suitable means may be used. For example, a separate chip or a piece of rubber may be attached to the rear face of the stopper wall near the vertex of the swelling portion. All such modifications and variations are intended to be included within the scope of the appended claims.

What is claimed is:

1. A hose clamp comprising:
    a clamp ring made of a metal strip rolled into a loop with its ends overlapping each other;
    a first and a second pinch each projected up from an end of the metal strip in a radial direction of the clamp ring, the first pinch having a frame defining an opening inside the frame and a stopper wall swelling into the opening from a corner of the frame, the second pinch having an operation chip extending in the width direction of the clamp ring; and
    a stopper rising from the clamp ring near a root of the second pinch, the stopper being engagable with the stopper wall, and further when the stopper is engaged with the stopper wall, the operation chip extending beyond an outer edge of the first pinch.

2. The hose clamp according to claim 1, wherein the hose clamp has a clamping position, at which the first and second pinches are apart from each other, and a loosened position, at which the first and second pinches are close to each other with the operation chip of the second pinch sticking out from the clamp ring in the width direction thereof.

3. The hose clamp according to claim 1, wherein the clamp ring has a restoring force.

4. The hose clamp according to claim 2, wherein when the hose clamp is brought into the loosened position, the stopper passes through the opening of the first pinch, and abuts against a rear face of the stopper wall.

5. The hose clamp according to claim 4, wherein the stopper wall has a slip-prevention means for preventing the stopper from slipping off from the rear face of the stopper wall when at the loosened position.

6. The hose clamp according to claim 5, wherein the slip-prevention means is a hook made monolithically with the stopper wall.

7. The hose clamp according to claim 2, wherein the clamp ring has a groove that is connected to the opening of the frame of the first pinch, and wherein the second pinch moves along the groove between the clamping position and the loosened position.

* * * * *